United States Patent [19]
Alexander

[11] Patent Number: 5,892,516
[45] Date of Patent: *Apr. 6, 1999

[54] PERSPECTIVE TEXTURE MAPPING CIRCUIT HAVING PIXEL COLOR INTERPOLATION MODE AND METHOD THEREOF

[75] Inventor: Thomas Alexander, Santa Clara, Calif.

[73] Assignee: Alliance Semiconductor Corporation, San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 625,479

[22] Filed: Mar. 29, 1996

[51] Int. Cl.$^6$ .................................................. G06T 11/00
[52] U.S. Cl. .......................................... 345/430; 345/431
[58] Field of Search ................................... 395/130, 125, 395/126, 127, 128, 129, 133, 141; 345/425–431, 433, 441

[56] References Cited

U.S. PATENT DOCUMENTS 5,230,039   7/1993   Grossman et al. ..................... 395/130

OTHER PUBLICATIONS

Foley et al., *Computer Graphics Principles and Practice*, Second Edition, Addison–Wesley Publishing Company, Inc., 1993, pp. 806–809.

Hecker, Chris, "Perspective Texture Mapping Part I: Foundations" *Game Developer*, Apr./May 1995, pp. 16–24.

*Primary Examiner*—Almis R. Jankus
*Attorney, Agent, or Firm*—Abdy Raissinia

[57] ABSTRACT

A perspective texture mapping circuit (10) is disclosed. In a perspective texture mapping mode, an inverse z gradient and corresponding inverse z polygon vertex value is loaded into a first interpolator circuit (14), and texture address product gradients with corresponding polygon vertex texture address product values are loaded into a second and third interpolator circuit (16 and 18). The first interpolator circuit (14) interpolates a sequence of inverse z values for the surface of the polygon. The second and third interpolator circuits (16 and 18) interpolate corresponding texture address product values for each interpolated inverse z value. The texture address product values are divided by the corresponding inverse z value in a divider circuit (12) to generate texture address values. Texture address values are coupled to texture memory (20) to generate texel values which are passed onto an output FIFO (26). In a color interpolation mode, each pixel includes three color component. Different color component gradients and vertex color component values are coupled to each interpolator circuit (14, 16 and 18) which interpolate corresponding color component values for the surface of the polygon. Corresponding color component values are coupled together to the output FIFO (26) to generate color pixels.

22 Claims, 4 Drawing Sheets

PERSPECTIVE TEXTURE MAPPING CIRCUIT HAVING PIXEL COLOR INTERPOLATION MODE AND METHOD THEREOF

TECHNICAL FIELD

The present invention relates generally to computer graphics systems, and more particularly to computer graphics systems for rendering images from three dimensional environments.

BACKGROUND OF THE INVENTION

The increasing computing power of personal computer systems has given rise to more complex and powerful system applications. One particular type of application gaining in popularity are those applications that model objects in a three dimensional (3D) space. 3D objects are commonly modeled as a collection of joined polygons (typically triangles) defined by vertex positions and attributes. Display images are created by projecting the objects onto a two dimensional viewing plane according to a rendering "pipeline." For an example of rendering pipelines see *Computer Graphics* by Foley et al. pp. 806–809.

The end result of the rendering process is a collection of pixels for each surface of the projected polygon. The particular value of a pixel depends upon the rendering method used. One method of rendering polygons is to generate the same color for all the pixels of the polygon. This provides for fast rendering but results in an image that can lack realism and/or detail. For increased realism polygons can be uniformly shaded (called flat shading) according to a shading scheme. This adds a degree of realism but can produce abrupt color change at polygon boundaries. A common method of providing realistic shading effects is interpolating color intensity across the surface of the polygon according to the vertex values; commonly referred to as Gouraud shading.

Another polygon rendering method fills the polygon surface, not with an interpolated color, but with a selected one of many stored texture maps. Each texture map includes a texture composed of a number of pixel values (also called "texels") each having a texture map address (commonly given by texture coordinates u and v). A selected texture is mapped to a given polygon surface by assigning a texture map address to each vertex of the polygon. The remaining pixels of the polygon are mapped to corresponding texture addresses according to a texture mapping scheme. "Affine" texture mapping makes no adjustment in texture map address according to the depth (z position) of the polygon surface, and so can result in a polygon surface that appears warped or otherwise distorted to the viewer. To compensate for the z position of a given polygon pixel "perspective" texture mapping is used. Perspective texture mapping interpolates the texture address across the polygon surface, typically by taking advantage of the fact that the gradient of the texture address divided by the depth (d(u/z) and d(v/z)) is linear with respect to the viewing plane. See "Under the Hood: Perspective Texture Mapping Part I: Foundations", *Game Developer*, April/May 1995 by Chris Hecker.

The Hecker article also sets forth a software perspective texture mapper. Software solutions to texture mapping can require considerable host processor resources, however. In order to free up system resources it is known to offload portions of the rendering pipeline onto specialized graphics accelerator hardware.

At the same time more and more image rendering tasks are being offloaded from the host processor to a graphics accelerator chip, there is conflicting drive to provide smaller and smaller die sizes in order to create a more cost effective product.

It would be desirable, therefor, to provide a graphics accelerator architecture for rendering polygons with the most efficient use of the circuits therein.

SUMMARY OF THE INVENTION

It is an object of the present invention to provide a graphics accelerator integrated circuit having the most efficient use of the circuits therein.

It is another object of the present invention to provide a perspective texture mapping circuit that can function as a color interpolator circuit.

According to the present invention, a perspective texture mapping circuit includes three interpolator circuits. In a texture mapping mode one of the interpolator circuits is loaded with a first texture address gradient and interpolates a first texture address product value across the surface of a polygon. The first texture address product is representative of a first texture address divided by a z value. In a similar manner, a second of the interpolator circuits is loaded with a second texture address gradient and interpolates second texture address product value across the surface of the polygon. The last of the interpolator circuits receives an inverse z gradient and interpolates inverse z values across the surface of the polygon. The first and second texture address product values are divided by corresponding inverse z values to generate a texture address for each pixel. In a color interpolation mode, each interpolator circuit receives a color gradient value for a given pixel color component, and interpolates a color component value for each pixel of the polygon surface. The color component values for each pixel are combined to create a single pixel color value.

According to one aspect of the present invention, the texture address gradients and inverse depth gradients are generated in a calculator circuit that includes a divider circuit. The divider circuit is also used to divide out the interpolated inverse z values from the texture address product values to generate texture addresses.

According to another aspect of the present invention the gradient values are left and right edge gradient values for a triangle, and are used to generate triangle edge values. The edge values are divided by the span of the triangle to generate a span gradient. The span gradient is recalculated for selected lines of each polygon.

An advantage of the present invention is that the same interpolators used to interpolate texture addresses in a texture mapping mode are used to generate color component values in a color interpolation mode.

Another advantage of the present invention is that a divider used to generate texture addresses is also used to calculate texture address product, inverse z, and color component gradients.

Other objects and advantages of the present invention will become apparent in light of the following description thereof.

DETAILED DESCRIPTION OF THE EMBODIMENTS

Figure 1:
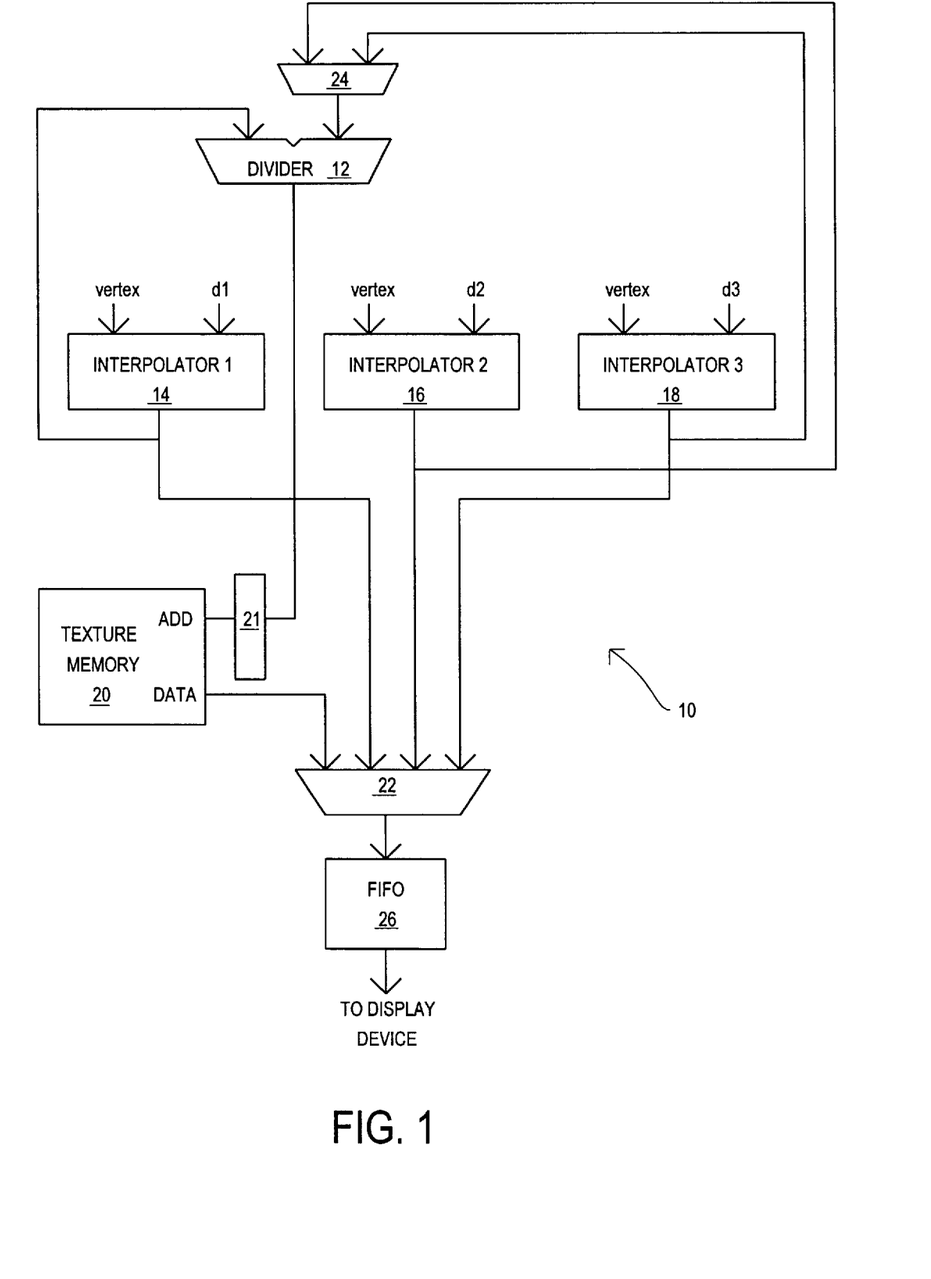
FIG. 1 is a block schematic diagram illustrating a perspective texture mapping circuit according to the present invention.

FIG. 1 sets forth, generally, a perspective texture mapping circuit according to the present invention. The texture mapping circuit is designated by the general reference character 10 and shown to include a divider circuit 12, a first interpolator circuit 14, a second interpolator circuit 16, and a third interpolator circuit 18. The output of the divider circuit 12 is coupled to a texture memory 20 that stores a number of texture maps. The 15 output of each interpolator circuit 14–18 are coupled to output MUX 22. In addition, the output of the first interpolator circuit 14 is coupled to one input of the divider circuit 12 and the outputs of the second and third interpolator circuits (16 and 18) are coupled to a divider input multiplexer (MUX) 24. The divider input MUX 24 alternately couples the output of the second or third interpolator circuit (16 and 18) to another input of the divider circuit 12.

Each interpolator circuit (14–18) receives a gradient input (shown as d1–d3) and vertex information (shown as vertex), and in response thereto, interpolates values for the pixels of a polygon.

Figure 2:
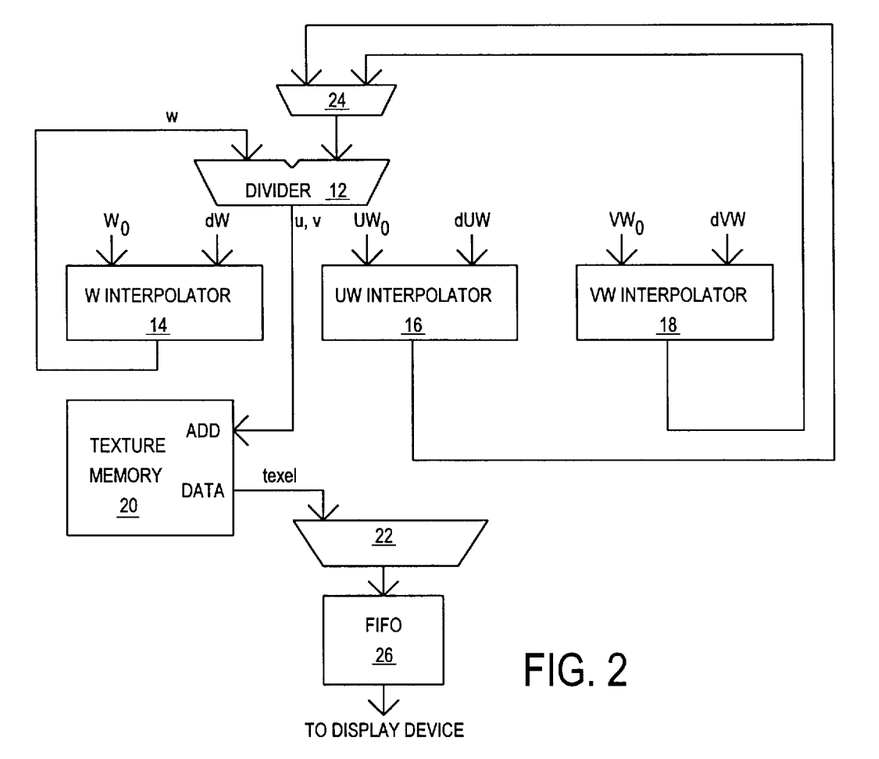
FIG. 2 is a block diagram schematic diagram illustrating the texture mapping mode of the present invention.

Referring now to FIG. 2, a block schematic diagram illustrates the operation of the circuit of FIG. 1 in a perspective texture mapping mode. The first interpolator circuit 14 receives a W value gradient (dW), as well as W value information for a vertex ($W_0$). As is well understood in the art, where each polygon vertex is defined in 3D space by an x, y, and z value, and W is equivalent to $1/z$ (and can be a normalized value as well). Using the dW value, the first interpolator circuit interpolates a W value for each pixel of the polygon. In a similar fashion, the second interpolator circuit 16 receives a dUW and $UW_0$ values as inputs, where U is a first texture map coordinate. At the same time the third interpolator circuit 18 receives dVW and $VW_0$ values, V being the second texture map coordinate. The second and third interpolator circuits (16 and 18) interpolate UW and VW values for each pixel. The UW and VW values are referred to herein as "texture address product" values.

As the W, UW and VW values are interpolated for each pixel, they are coupled to the inputs of divider circuit 12. W values go into one input, while the other input receives a UW value and then a VW value. In this manner the divider circuit 12 divides out the W value from corresponding UW and VW value to generate a pair of texture map coordinates; U and V. The texture map coordinates are coupled to the texture memory 20 through an address translator 21 which generates a particular texture memory address corresponding to the U and V values. In response to the memory address, the texture memory 20 outputs a texel value. The texel is coupled to an output FIFO 26, by way of the output MUX 22, and the output FIFO 26 provides the pixel values to an output device for display.

Figure 3:
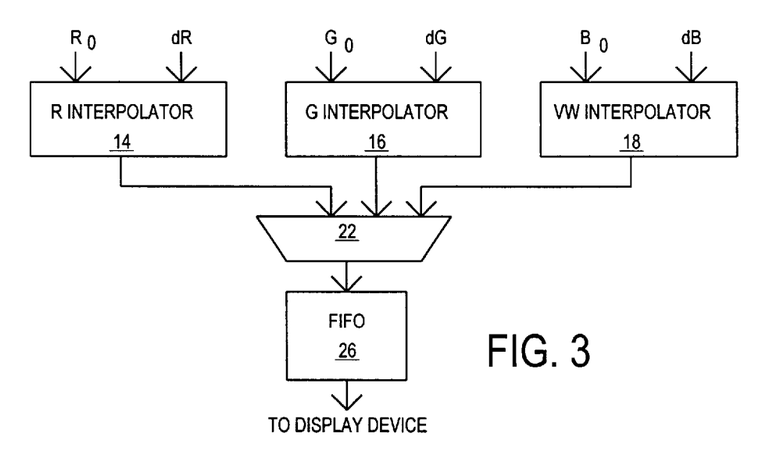
FIG. 3 is a block schematic diagram illustrating a Gouraud color interpolation mode of the present invention.

FIG. 3 illustrates the same circuit as FIGS. 1 and 2, but in a color interpolation mode. In the particular embodiment set forth in FIG. 3, the circuit performs Gouraud shading on a polygon. As in the perspective texture mapping mode, each interpolator circuit (14–18) receives a gradient and a vertex value. In a preferred embodiment, the first interpolator circuit 14 receives a red color component gradient (dR) and red vertex value ($R_0$). In the same manner, the second and third interpolator circuits (16 and 18) receive gradients and vertex values for green (dG and $G_0$) and blue color components (dB and $B_0$), respectively. For each pixel of the polygon, a red, green, and blue value is interpolated. These three values will create an RGB pixel value. Unlike, the perceptive texture mapping mode, which requires a divide by W step, in the color interpolation the outputs of the interpolator circuits (12–16) are coupled directly to the output FIFO 26 by the output MUX 22.

Figure 4:
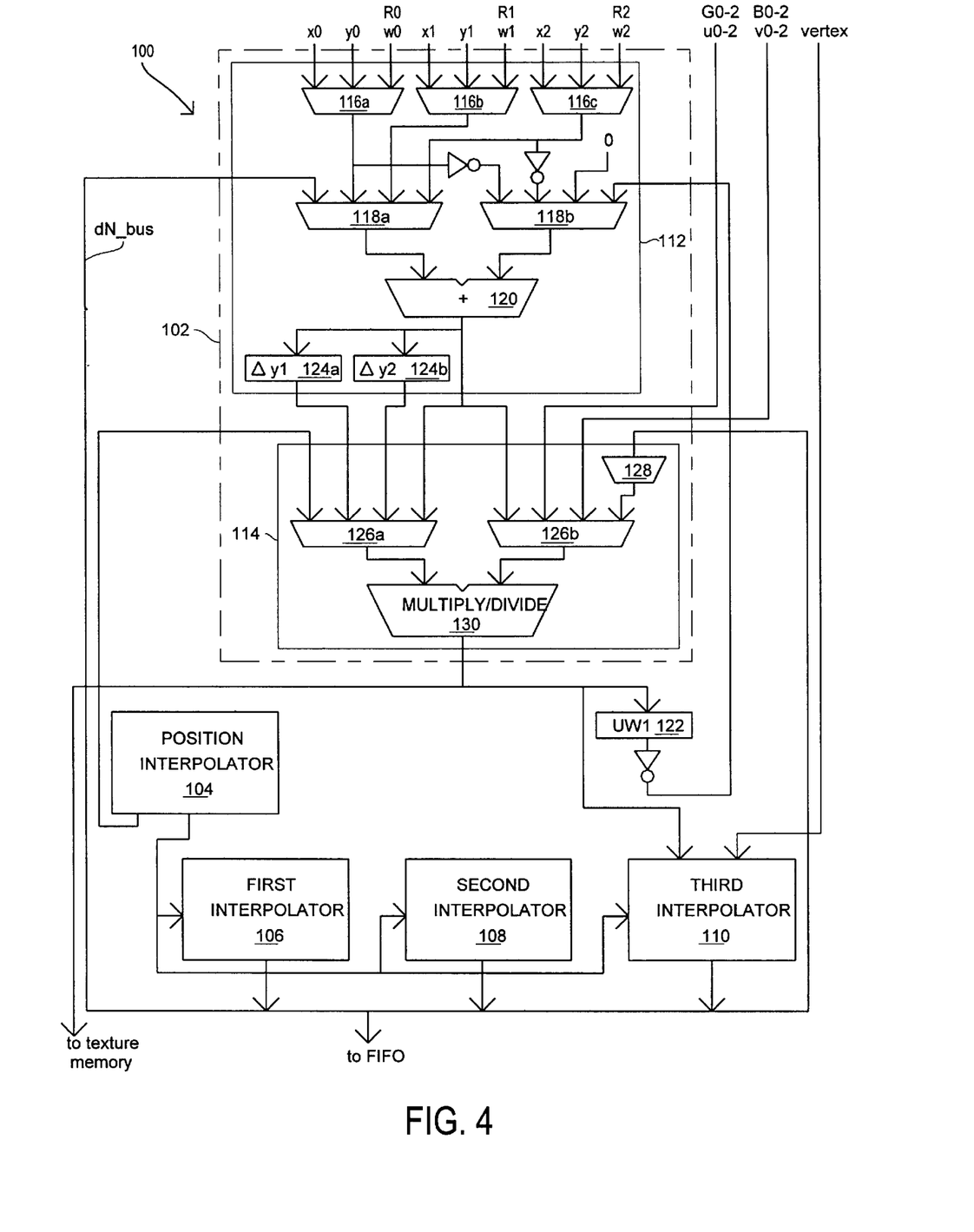
FIG. 4 is block schematic diagram illustrating a preferred embodiment of the present invention in detail.

Referring now to FIG. 4, a detailed block schematic diagram sets forth a preferred embodiment of the present invention. The polygon interpolating circuit is intended to be an integral portion of a graphics accelerator integrated circuit, and is operable in both a texture mapping mode and a color interpolation mode. The circuit is designated by the general reference character 100 and shown to include a calculator circuit 102, a position interpolator circuit 104, a first value interpolator 106, a second value interpolator 108, and a third value interpolator 110.

The calculator circuit 102 can be conceptualized as having a subtraction section 112 and a multiply/divide section 114. The subtraction section 112 includes a first, a second, and a third vertex input MUX (116a, 116b and 116c). In a texture mapping mode, the vertex input MUXs (116a–116c) receive x, y, and w values for each vertex. In a color interpolation mode, x, y, and one color component of the pixel is received (the red portion of an RGB pixel in the example of FIG. 4). Each vertex input MUX (116a–116c) couples its respective vertex input values (x, y, w or R) to a first or second subtractor input MUX (118a and 118b). The subtractor input MUXs (118a and 118b), in turn, couple their respective x, y, w or R values to the inputs of a subtractor unit 120.

As set forth in FIG. 4, in addition to receiving vertex input values, in the preferred embodiment, the first subtractor input MUX 118a also receives a further input value, shown as dN_bus, and the second subtractor input MUX 118b receives two other inputs (UW1 and "0"). The dN_bus input is the output of the multiply/divide section 114. The 0 input, is the value zero, which results in a subtract 0 operation (no change in value). The UW1 input is provided by a multiply/divide output register 122 discussed below. In a preferred embodiment the subtractor is implemented by a 16 bit adder that receives input values in two's complement form.

The output of the subtractor unit 120 is coupled to the multiplier/divider section 114 of the calculator circuit 102, as well as a Δy1 register 124a and a Δy2 register 124b.

The multiply/divide section 114 includes a first and second multiplier input MUX (126a and 126b, respectively). As shown in FIG. 4, the output of the subtractor unit 120 is coupled to both multiplier input MUXs (126a–126b). The first multiplier input MUX 126a receives the outputs of the Δy1 and Δy2 registers (124a–124b) and an X_span input from the position interpolator circuit 104. The second multiplier input MUX 126b also receives vertex input values (u_in/G and u_in/B) and an input from a bus MUX 128. The bus MUX 128 receives a N_bus input which is the output of the value interpolators (106, 108 and 110). The multiplier input MUXs (126a–b) couple values to a multiply/divide unit 130 which performs either a multiply or a divide operation.

In a preferred embodiment, the output of the multiply/divide unit 130 is coupled to the position interpolator 104, and further to the first, second and third value interpolators (106, 108, and 110), the texture memory (not shown in FIG. 4) and the multiply/divide output register 122.

Figure 5:
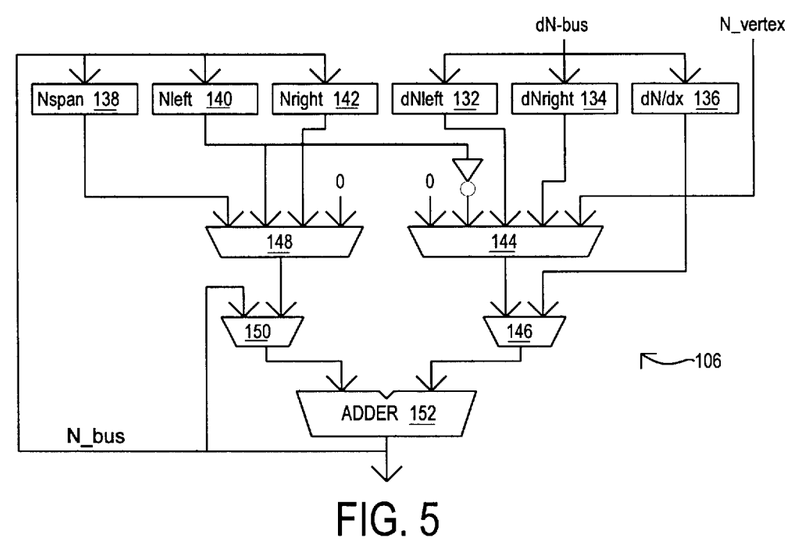
FIG. 5 is a block schematic diagram illustrating the first value interpolator circuit according to a preferred embodiment.

FIG. 5 sets forth in detail, the first value interpolator 106 according to a preferred embodiment of the present invention. The first value interpolator 106 includes a first set of registers; a left edge gradient register (dNleft 132), a right edge gradient register (dNright 134), and an X direction gradient register (dN/dx 136). A second set of register includes a span value (Nspan) register 138, a left edge value (Nleft) register 140, and a right edge value (Nright) register 142. A first select MUX 144 receives the dnleft and dnright values, a vertex value (N_vertex), a zero value, and the complement of the Nleft value. The first select MUX 144 selectively couples one of these values to one input of a first interpolate MUX 146. The other input of the first interpolate MUX 146 receives the dN/dx value. Similarly, a second select MUX 148 couples either the Nspan value, Nleft value, Nright value, or zero value to one input of a second interpolate MUX 150.

The outputs of the first and second interpolate MUXs (146 and 150) are coupled to an interpolator adder unit 152. The output of the adder unit 152 is coupled to one input of the second interpolate MUX 150 as well as to the inputs of the Nspan, Nleft and Nright registers, via the N_bus.

The second and third value interpolator circuits (108 and 110) have the same general configuration as the first interpolator circuit discussed above, and so are not further described herein.

Figure 6:
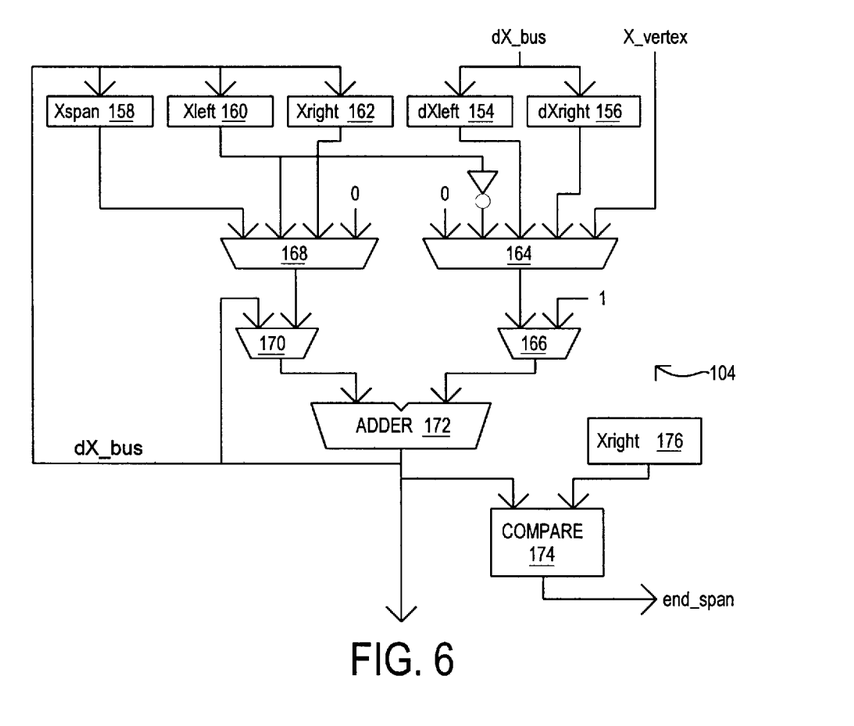
FIG. 6 is a block schematic diagram illustrating a position interpolator circuit according to the preferred embodiment.

Referring now to FIG. 6, the position interpolator circuit 104 according to a preferred embodiment is set forth in detail. As in the case of the first, second and third value interpolators (106, 108 and 110), the position interpolator 104 includes left x and right X edge gradient registers (154 and 156) for receiving and storing dXleft and dXright values, respectively. Xspan, Xleft and Xright registers (158, 160 and 162, respectively) receive and store Xspan and edge values. A first X select MUX 164 receives as inputs, zero, the complement of the Xleft value, dXleft and dXright. Further, a fourth input receives either zero, or a vertex value (X_vertex). One of the input values to the X select MUX 164 is coupled to one input of a first X interpolate MUX 166. The other input receives zero as an input. A second X select MUX 168 receives the Xspan, Xleft and Xright values as inputs, as well as a zero value, and couples one of its inputs to one input of a second X interpolate MUX 170. The X interpolate MUXs (168 and 170) each couple one of their respective input values to an X interpolator adder unit 172. The output of the adder unit 172 is coupled by a dX_bus to the inputs of the Xspan, Xleft and Xright registers (158, 160 and 162). Unlike the other interpolator circuits (106, 108 and 110), the position interpolator circuit 104 includes an end line compare circuit 174 and store register 176.

Referring now to FIG. 4, the operation of the polygon interpolating circuit 100 according to a preferred embodiment will now be described. In a perspective texture mapping mode, vertex y position data are clocked through the subtraction section 112 to generate y difference values. In particular, the complement of y0 and y1 are coupled to subtractor unit 120 to generate a Δy1 value which is stored in register 124a. Similarly, the complement of y0 and y2 result in a Δy2 value that is stored in register 124b.

The Δy1 and Δy2 values are used to generate the remaining edge gradient values. The x0 gradient position value is subtracted from x1 to generate a Δx1 value. This value is clocked on to the multiply/divide section 114 along with the Δy1 value from register 124a by operation of the input MUXs (126a and 126b). The multiply/divide unit 130 divides Δx1 by Δy1 to generate a dXleft value. This value is stored in position interpolator 104. In the same manner a dXright value is generated from Δy2 and the x0 and x2 vertex values, and then stored in position interpolator 104.

One skilled in the art would recognize the dWleft and dWright values can be generated in the same manner as the dXright and dXleft values described above, using the w0, w1, w2, Δy1, and Δy2 values. The resulting dWleft and dWright are stored in the first interpolator circuit 106.

Texture address product gradients are generated by first calculating a texture address product. First a uw0 value is generated by coupling w0 through the first vertex input MUX 116a and first subtractor input MUX 118a along with the zero value from the second subtractor input MUX 118b. As a result the w0 value is output from the subtractor section 112. The w0 value is coupled to the multiply/divide unit 130 by operation of the first multiply/divide input MUX 126a. At the same time, a u0 value is coupled to the multiply/divide unit 130 by operation of the second input MUX 126b. The multiply/divide unit 130 functions in a multiply mode and generates the address product value uw0. This value is stored in the multiply divide output register 122. The values u1 and w1 are multiplied together in the same manner as u0 and w0 to generate a uw1 value. The uw0 value and inverted (complement) uw1 value are then coupled back to the subtraction section 112 by operation of the subtractor input MUXs (118a and 118b) to calculate a Δuw1 value. In the same fashion as the dXleft and dWleft values, Δy1 is used to generate a dUWleft value. It follows that a dUWright value is generated from u2, w2, uw0 and Δy2. The resulting dUwleft and dUW right values are stored in the second value interpolator circuit 108.

Second texture address gradients dVWleft and dVWright are calculated from the v0, w0, v1, w1, v2, w2, Δy1 and Δy2 values. The dVWleft and dVWright gradients are stored in the third value interpolator circuit 110.

Referring still to FIG. 4, the first, second and third value interpolators (106, 108, and 110) each receive a starting vertex value. Using the vertex values and the previously stored edge gradients, two interpolated address product values (uwn, vwn) and an interpolated w values (wn) are generated for each pixel of the projected polygon. The un and wn values are coupled to one input of the multiply/divide unit 130 by operation of bus MUX 128 and the second multiply/divide input MUX 126b. The wn values are coupled to the other input of the multiply/divide unit 130 by the operation of the first multiply/divide input MUX 126a. The multiply/divide unit divides the uw or vw value by w, to generate a u or v value, respectively, for the pixel texture address. As was set forth in FIG. 2, the u and v values for each pixel are coupled to a texture memory by way of an address translator to generate a texel value.

The color interpolation mode uses the same circuit arrangement as the texture mapping mode, with some variation in the operation of the multiply/divide section 114. At the start of the color interpolation of a polygon, the Δy1, Δy2, dXleft and dXright values are calculated and then stored in registers 124a and 124b, and the position interpolator circuit 104, respectively, in the same manner as the perspective texture mapping mode.

As described above in conjunction with FIG. 3, instead of interpolating w, uw and vw values, in the color interpolation mode the present invention interpolates pixel color component values (red, green, and blue, in the example of FIG. 4).

Instead of w values being provided at the vertex input MUXs (116a–c) the red color component value of an RGB pixel is provided (shown as R0–R1). These R values are operated on in the same manner as the w0–w1 values to generate a dRright and dRleft value, which are stored in the first value interpolator 106.

Green color edge gradients are generated by coupling a G0 value, via the second multiply/divide input MUX 126b, to the multiply/divide unit 130. The operation of the multiply/divide unit 130 is disabled and the G0 value is stored in output register 122. G1 is then coupled through the disabled multiply/divide unit 130 and then applied to one input of the subtractor unit 120 by operation of the first subtractor input MUX 118a. The complement of G0 is coupled to the other input of the subtractor unit 120 by operation of the second subtractor input MUX 118b. G0 is subtracted from G1 and the difference divided by Δy1 in the multiply/divide unit 130 to generate a dGleft value. The calculation of the dGright, dBleft and dBright values follows. The dGright and dGleft values are stored in the second value interpolator circuit 108. The dBleft and dBright values are stored in the third value interpolator circuit 110.

The value interpolator circuits (106, 108 and 110) receive R, G and B vertex values, respectively, and using the stored edge gradients, interpolate R, G and B values to generate RGB pixels for the projected polygon. As described previously, the RGB pixels are coupled to the output FIFO.

The operation of the interpolator circuits (104, 106, 108, and 110) are best understood with reference to FIGS. 4–6. In a preferred embodiment, each interpolator circuit (104, 106, 108, and 110) interpolates values for a polygon on a line by line basis, with the position interpolator indicating the end of each line. Referring now to FIG. 6, the position interpolator 104 receives vertex value X_vertex, and by operation of the first X select MUX 164, couples the vertex value to one input of the X interpolator adder unit 172. The other adder unit 172 input receives a value of zero by operation of the second X select MUX 168. The sum (X_vertex) is stored as the Xleft and Xright values in registers 160 and 162. Xleft and dXleft are then coupled to adder unit 172 to generate a new Xleft value which is stored in register 160. In a similar manner, Xright and dXright are added together to generate a new Xright value which is stored in register 160. The Xright value is also stored in register 176 for comparison. Xleft is then subtracted from Xright by coupling Xright and the complement of Xleft to the adder unit 172. The resulting Xspan value is stored in register 158. Once the X_span value has been used to calculate the x gradient values (e.g., dW/dX, dUW/dX and dVW/dX) the Xleft value is stored in register 158.

The position interpolator 104 then steps across the current polygon line by coupling the Xleft value from register 158 and the value 1 to adder unit 172. The resulting output is stored in register 158 and also compared with the Xright value in comparator 174 to determine if the end of the current polygon line has been reached. If and end of line is indicated, the position interpolator 104 provides an end_span signal to the other interpolators (106, 108, 110). At the start of a new line, dXleft and dXright are added to Xleft and Xright, respectively, to generate a new Xleft and Xright values. Xleft and Xright are used to generate a new Xspan value, and the interpolator begins stepping across the new line, until and end of line is indicated.

The operation of the value interpolators is best understood with reference to FIGS. 4 and 5. In a similar manner to the position interpolator, dnleft and dNright are added to N_vertex to generate Nleft and Nright values, which are stored in registers 140 and 142. These values are subtracted to generate an Nspan value which is stored in register 138. It is understood that "N" is the value W in the perspective texture mapping mode, and the value R in the color interpolation mode.

Referring now to FIG. 4, at the start of a line of a polygon, the Xspan value for that line is coupled to one input of the multiply/divide unit 130 by operation of MUX 126a. At the same time the Nspan value is coupled to the other input of unit 130 by operation of MUXs 126b and 128. The Nspan value is divided by the Xspan value to generate the dN/dX value. Referring back to FIG. 5, the dN/dX value is stored in register 136. It is understood that this operation is repeated for the second and third value interpolators (108 and 110) to generate dUW/dX and dVW/dX values in the texture mapping mode, and dG/dX and dB/dX values in the color interpolation mode.

In a similar manner as the position interpolator 104, once the Nspan value has been used to generate a dN/dX value, the Nleft value is stored in the Nspan register 138. The dN/dX value is added to the Nleft value from register 138 to step across the current polygon line. The results of the add operation are stored in register 138. In this manner, Wn or Gn values are generated for the current polygon line. When an end_span signal is received from the position interpolator 104, new Nleft, Nright, Nspan, and dN/dX values are generated, and values for the next line are interpolated.

The operation of the second and third value interpolators 108 and 110, are essentially identical to the first value interpolator 106 set forth in FIG. 5, naturally follows from the above description, and would clearly be understood by one skilled in the art.

It is understood that the examples set forth in FIGS. 1–6 are preferred embodiment of the present invention, and that the invention may be changed, and other embodiments derived, without departing from the spirit and scope of the invention. Accordingly, the invention is intended to be limited only by the appended claims.

What I claim is:

1. A computer graphics perspective texture mapping system having a pixel color interpolation mode, comprising:
   an interpolator circuitry;
   first means for coupling texture map gradient and texture map vertex values to said interpolator circuitry in a texture mapping mode; and
   second means for coupling color gradient and color vertex values to said interpolator circuitry in a color interpolation mode,
   wherein said interpolator circuitry interpolate said texture map gradient and texture map vertex values in said texture mapping mode, and the same interpolator circuitry interpolates said color gradient and color vertex values in said color interpolation mode.

2. The system of claim 1, including:
   the texture map gradients including texture address product gradients and inverse z gradients and the texture address vertex values including texture address product vertex values and inverse z vertex values; and
   an arithmetic circuit for receiving interpolated texture address product values and inverse z values and performing the equivalent of a division operation thereon to generate texture address output values.

3. The system of claim 1, wherein:
   said interpolator circuitry includes at least three interpolators, each operable in both said texture mapping mode and said color interpolation mode; wherein in the texture mapping mode,
  a first and second of the three interpolators receive address product gradients representative of the change in texture address values divided by a depth (Z) value over the surface of the polygon, and interpolates texture address values for the surface of the polygon therefrom, and
  a third interpolator circuit receives an inverse z gradient value (1/Z) representative of the change in the inverse of the z value over the polygon, and interpolates inverse depth values for the surface of the polygon.

4. The system of claim 3, including:
in the texture mapping mode the first and second interpolators generate address product pair values (U/Z, VIZ) for each pixel of a polygon, and the third interpolator generates corresponding inverse depth values (1/Z) for each pixel of the polygon;
means for coupling the address product pair values to said arithmetic circuit with corresponding inverse depth values for each pixel of the polygon; and
an arithmetic circuit for dividing the address product pair values by corresponding inverse depth values to generate texture address pair values for each pixel of the polygon.

5. The system of claim 4, including:
third means for coupling the texture address pairs from said arithmetic unit to a texture memory.

6. The system of claim 3, including:
in the color interpolation mode each of the three interpolators receives a different color component gradient representative of the change in a color component over the surface of the polygon, each interpolator interpolating respective color component values over the surface of the polygon.

7. The system of claim 1, wherein:
said interpolator circuitry includes a plurality of interpolators and wherein selected interpolators receive gradient values including a first edge gradient and a second edge gradient, the first edge gradient representing the change in a polygon value along a first edge of the polygon, the second edge gradient representing the change in a polygon value along a second edge of the polygon.

8. The system of claim 7, wherein:
each polygon is composed of a number of coordinates (x, y); and
the first edge gradient values are left edge gradient values and represent the change in a polygon value along a left polygon edge for each increase in the display plane coordinate value y, and
the second edge gradient values are right edge gradient values and represent the change in a polygon value along a right polygon edge for each increase in the display plane coordinate value y.

9. The system of claim 7, including:
a span calculator circuit for calculating the difference in x coordinate values between left and right edges of the polygon for a given y value to generate an x-span value.

10. The system of claim 9, including:
each said interpolator generates consecutive left edge values and right edge values for each increase in the display plane coordinate y and calculates the difference thereof to generate a span value difference;
means for coupling the x-span value and the span value differences to an arithmetic unit, said arithmetic unit divides each span value difference by the x-span value to generate dx gradients; and
means for coupling the dx gradients to said interpolators.

11. An interpolator circuitry comprising:
at least three input registers for storing polygon vertex data, the polygon vertex data including texture map address data in a texture mapping mode and pixel color data in a color interpolation mode;
a calculator circuit for receiving the vertex data and generating polygon value gradients therefrom, the polygon value gradients including texture address gradients in a texture mapping mode and color value gradients in a color interpolation mode;
a polygon value interpolation circuit for receiving the polygon value gradients and interpolating polygon values therefrom, said polygon values including interpolated texture addresses in a texture mapping mode and interpolated color values in a color interpolation mode.

12. The interpolator circuitry of claim 11, wherein:
said input registers further receive display plane vertex position data; and
said calculator circuit receives the display plane vertex position values for a polygon and generates polygon edge gradients therefrom; and
said polygon value interpolation circuit includes a polygon position interpolator for receiving the position values of one polygon vertex, and the polygon edge gradients and defining the limits of the polygon.

13. The interpolator circuitry of claim 12, including:
in the texture mapping mode, said calculator circuit further receives texture address vertex values and vertex z-position values, and in response thereto, generates an inverse z-position gradient representative of the change in the inverse of z position (1/z) with respect to display plane position, and a texture address product gradients, representative of the change in the texture address divided by z with respect to display plane position.

14. The interpolator circuitry of claim 11, wherein:
said polygon value interpolation circuit further includes a plurality of interpolators, operable in the texture mapping mode as
  a texture address interpolator responsive to the polygon edge interpolator, for receiving a texture address product value for at least one polygon vertex and the texture address product gradients, and interpolating texture address product values for the polygon, and
  an inverse z interpolator for receiving the inverse depth value of at least one polygon vertex and the inverse depth gradients, and interpolating inverse depth values for the polygon, wherein
    the texture address interpolator and the inverse z interpolator are further both responsive to the polygon position interpolator for interpolating their respective values within the limits of the polygon.

15. The interpolator circuitry of claim 13, wherein:
in the texture mapping mode the texture address/inverse z product values of the texture address interpolator are divided by the inverse z values of the inverse depth interpolator in the calculator circuit to generate texture address data.

16. The interpolator circuitr of claim 13, wherein:
in the color interpolation mode, said plurality of interpolators are operable as a plurality of color component interpolators for interpolating color components for the polygon, the color component interpolators being further responsive to the polygon position interpolator for interpolating their respective color component values within the limits of the polygon.

17. A method of generating interpolated gradient values in a texture mapping mode and generating interpolated gradient color values in color interpolation mode using a single interpolating circuitry in both modes, comprising the steps of:

in a texture mapping mode,
    providing a set of gradient values to said interpolator circuitry, and
    generating interpolated gradient values from said set of gradient values; and in a color interpolation mode,
    providing a set of color gradient values to said interpolator circuitry, and
    generating interpolated color gradient values from said set of color gradient values.

18. The method of claim 17, wherein said interpolator circuitry includes at least three interpolators.

19. The method of claim 18, wherein in the texture mapping mode, the providing step includes the steps of
    a) providing at least one of the interpolators with a first gradient representative of the change in a first texture address value across a polygon,
    b) providing a second of the interpolators with a second gradient representative of the change in a second texture address value across the polygon; and
    c) providing another of the interpolators with a third gradient representative of the change in a z position value across the polygon.

20. The method of claim 19, wherein the first gradient value is equivalent to the change in the first texture address (u) divided by a z position value over the polygon (d(u/z)); and the second gradient value is equivalent to the change in the second texture address (v) divided by the z position value (d(v/z)).

21. The method of claim 18, wherein in the color interpolation mode, the providing step includes the steps of
    a) providing at least one of the interpolators with a first color gradient representative of the change in a first color component across the polygon,
    b) providing a second of the interpolators with a second color gradient representative of the change in a second color component across the polygon; and
    c) providing another of the interpolators with a third color gradient representative of the change in a third color component across the polygon.

22. The method of claim 21, wherein the combination of the first, second and third color gradient representatives comprise a pixel color.

* * * * *